United States Patent
Wang

(10) Patent No.: US 8,036,216 B1
(45) Date of Patent: Oct. 11, 2011

(54) METHOD AND APPARATUS FOR PACKET CUT-THROUGH

(75) Inventor: Sibing Wang, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 781 days.

(21) Appl. No.: 11/857,249

(22) Filed: Sep. 18, 2007

Related U.S. Application Data

(63) Continuation of application No. 11/250,873, filed on Oct. 14, 2005, now Pat. No. 7,573,896.

(51) Int. Cl.
*H04L 12/56* (2006.01)
(52) U.S. Cl. .................... 370/389; 370/419
(58) Field of Classification Search .............. 370/389, 370/401, 402, 412, 418, 419, 428, 429
See application file for complete search history.

(56) References Cited

U.S. PATENT DOCUMENTS

| | | | | |
|---|---|---|---|---|
| 5,926,626 | A * | 7/1999 | Takeuchi et al. | 709/249 |
| 5,991,295 | A * | 11/1999 | Tout et al. | 370/395.7 |
| 6,144,668 | A * | 11/2000 | Bass et al. | 370/401 |
| 6,233,243 | B1 * | 5/2001 | Ganmukhi et al. | 370/412 |
| 6,480,468 | B1 * | 11/2002 | Kishigami et al. | 370/230.1 |
| 6,954,466 | B1 | 10/2005 | Dalleggio et al. | |
| 7,391,787 | B1 * | 6/2008 | McCrosky | 370/413 |
| 2002/0118692 | A1 * | 8/2002 | Oberman et al. | 370/419 |
| 2003/0117958 | A1 | 6/2003 | Nation et al. | |
| 2004/0252684 | A1 | 12/2004 | Evans et al. | |

* cited by examiner

*Primary Examiner* — Hassan Phillips
*Assistant Examiner* — Saba Tsegaye
(74) *Attorney, Agent, or Firm* — Heimlich Law, PC; Alan Heimlich, Esq.

(57) ABSTRACT

A method and apparatus for packet cut-though have been disclosed. In packet cut-through mode successive packet fragments are associated an identical logical data flow. This allows, for example, a SPI-4 interface to be able to successively transmit a whole packet for a logical port without intervening by traffic of other logical ports.

4 Claims, 5 Drawing Sheets

METHOD AND APPARATUS FOR PACKET CUT-THROUGH

RELATED APPLICATION

This patent application is a continuation of, and claims priority, of U.S. application Ser. No. 11/250,873 filed Oct. 14, 2005 titled "Method and Apparatus for generic interface, packet cut-through, overbooking, queue concatenation, and logical identification priority for a System Packet Interface device", which is hereby incorporated herein by reference, which claims priority of U.S. Provisional Application Ser. No. 60/619,234 filed Oct. 15, 2004 titled "Method and Apparatus for generic interface, packet cut-through, overbooking, queue concatenation, and logical identification priority for a System Packet Interface device", which is hereby incorporated herein by reference.

FIELD OF THE INVENTION

The present invention pertains to packets. More particularly, the present invention relates to a method and apparatus for packet cut-through.

BACKGROUND OF THE INVENTION

Packets are used in communications to convey data. Therefore how packets are handled (e.g. assembled, reassembled, switched, routed, etc.) can have an impact on things such as data throughput, latency, priority of arriving data, etc. If not handled properly or limited to a specific format could lead to latency and possible loss of data. This may present a problem.

In a SPI-4 interface (System Packet Interface v4), for example, a packet Y with fragments as illustrated in FIG. 3, and a packet Z with fragments as illustrated in FIG. 4, in cut-through mode (N.B. not packet cut-through), a data path carries successive packet fragments (associated to various logical data flow) as illustrated in FIG. 5. The delayed arrival of some fragments may present a problem.

BRIEF DESCRIPTION OF THE DRAWINGS

The invention is illustrated by way of example and not limitation in the figures of the accompanying drawings in which.

DETAILED DESCRIPTION

The present invention as embodied in one embodiment of a device may be used in a variety of flow control applications, for example, for packet processing. A packet-exchange device solves a myriad of interconnect problems in networking markets. For example, in one embodiment it may support 10 Gbps packet processing and offer a wide range of options for logical port density and buffering capabilities, ranging from low latency switching through complex flow-control designs.

In one embodiment of the invention, options and flexibility for demanding applications is provided. For example, by helping to regulate end-to-end traffic flow, where the system may be subject to "bursty" data that can interfere with the correct operation of flow-control mechanisms or where low latency and/or higher priority may be needed for packet fragments.

Figure 3:
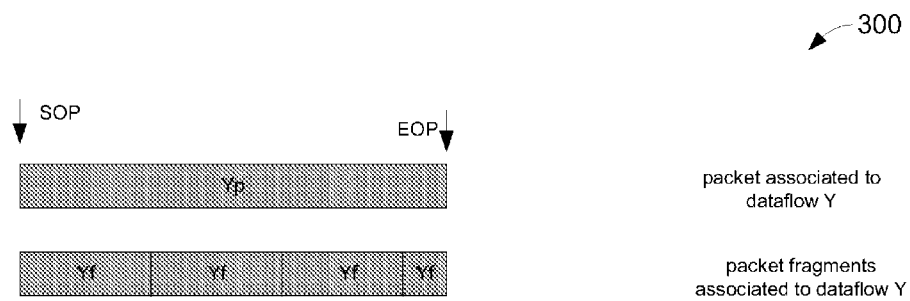
FIG. 3 and FIG. 4 illustrate packets and associated fragments for illustrating embodiments of the invention.
Figure 4:
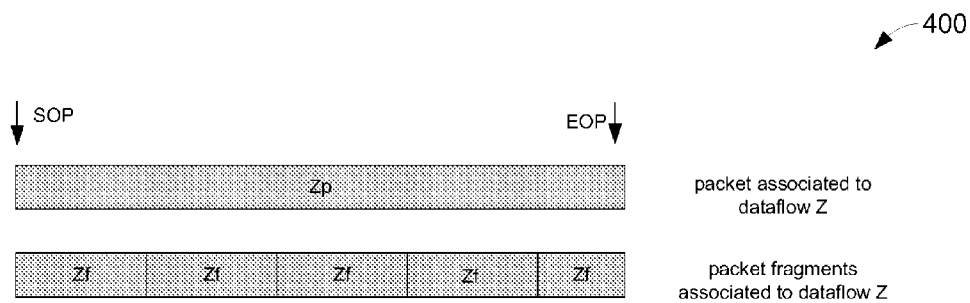
Figure 5:
FIG. 5 illustrates a current approach of data flow for a data path in cut through mode showing successive packet fragments.
Figure 6:
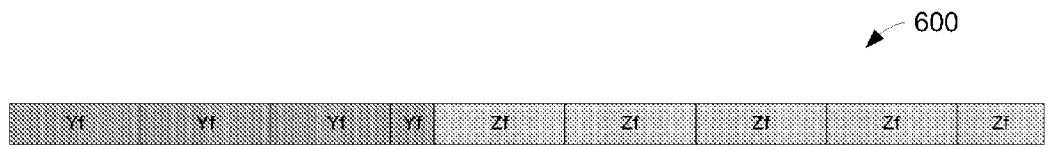
FIG. 6 illustrates one embodiment of the present invention showing a data flow in packet cut-though mode showing successive packet fragments.

FIG. 6 illustrates, generally at 600, one embodiment of the invention showing how in a packet cut-though mode successive packet fragments (e.g. Yf, and Zf as shown for example in FIG. 3 and FIG. 4) are associated an identical logical data flow.

Figure 7:
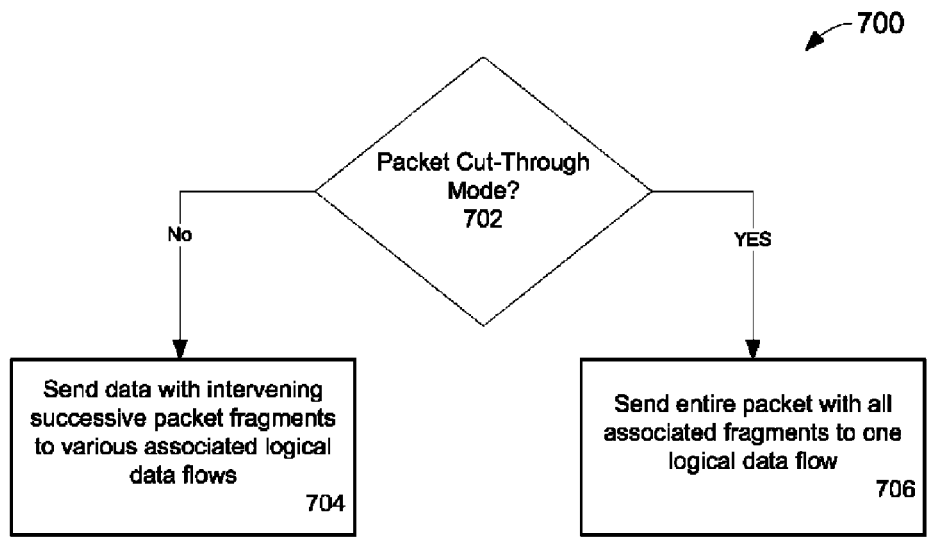
FIG. 7 illustrates one embodiment of the present invention in flow chart form.

FIG. 7 illustrates, generally at 700, one embodiment of the invention in flow chart form. At 702 a determination is made to see if the packet cut-through mode has been selected. If not then at 704 data with intervening packet fragments is successively sent to various associated logical data flows (e.g. logical ports). If packet cut-through mode has been selected then at 706 all the fragments for an entire packet are assembled and sent to one logical data flow (e.g. logical port).

What is to be appreciated is that in packet cut-through mode successive packet fragments are associated an identical logical data flow. This allows, for example, a SPI-4 interface to be able to successively transmit a whole packet for a logical port without intervening by traffic of other logical ports.

Figure 8:
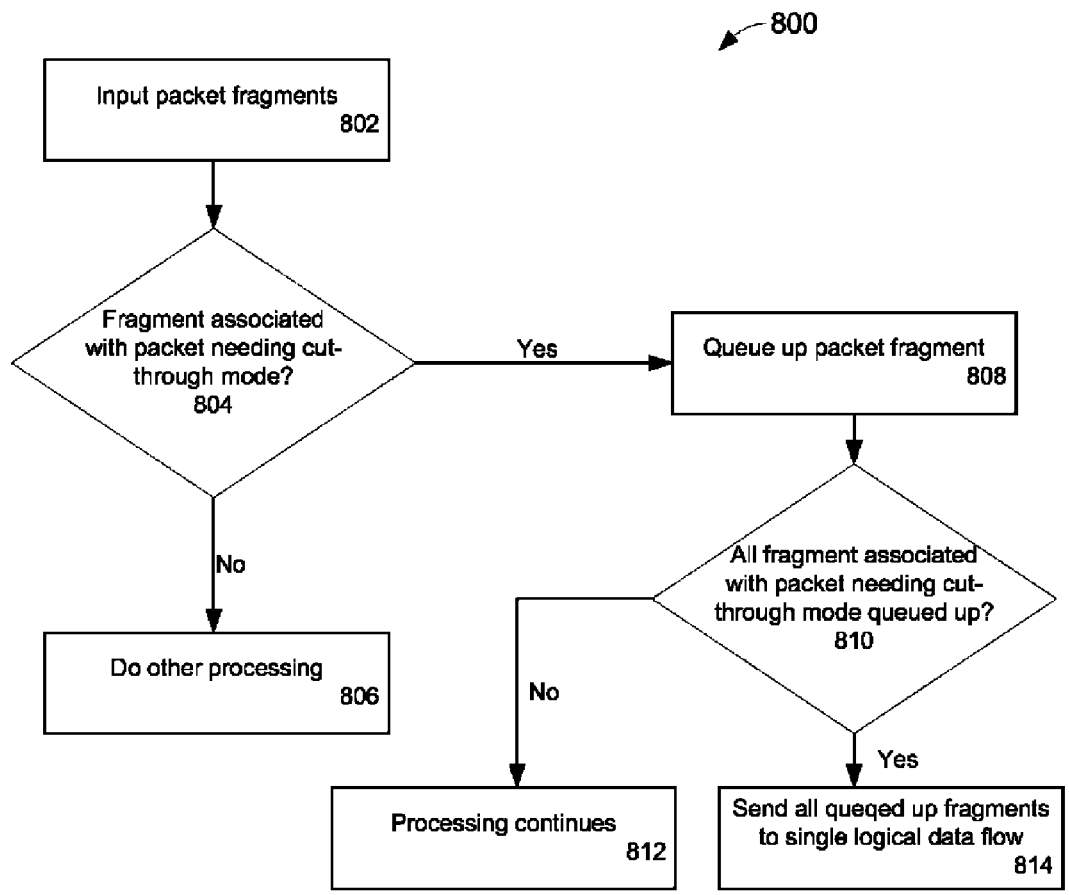
FIG. 8 illustrates one embodiment of the present invention in flow chart form.

FIG. 8 illustrates, generally at 800, one embodiment of the invention in flow chart form. At 802 packet fragments are received. At 804 a received packet fragment is examined to see if it is associated with a packet needing packet cut-through mode, if not then that 806 something else is done with the packet fragment, if yes then at 808 the packet fragment is queued up. At 810 a check is made to see if all the fragments associated with the packet needing packet cut-through are queued up, and if not then at 814 processing continues. If all packet fragments associated with the packet needing packet cut-through are queued up then at 812 the all packet fragments queued up associated with associated with the packet needing packet cut-through are sent.

Figure 9:
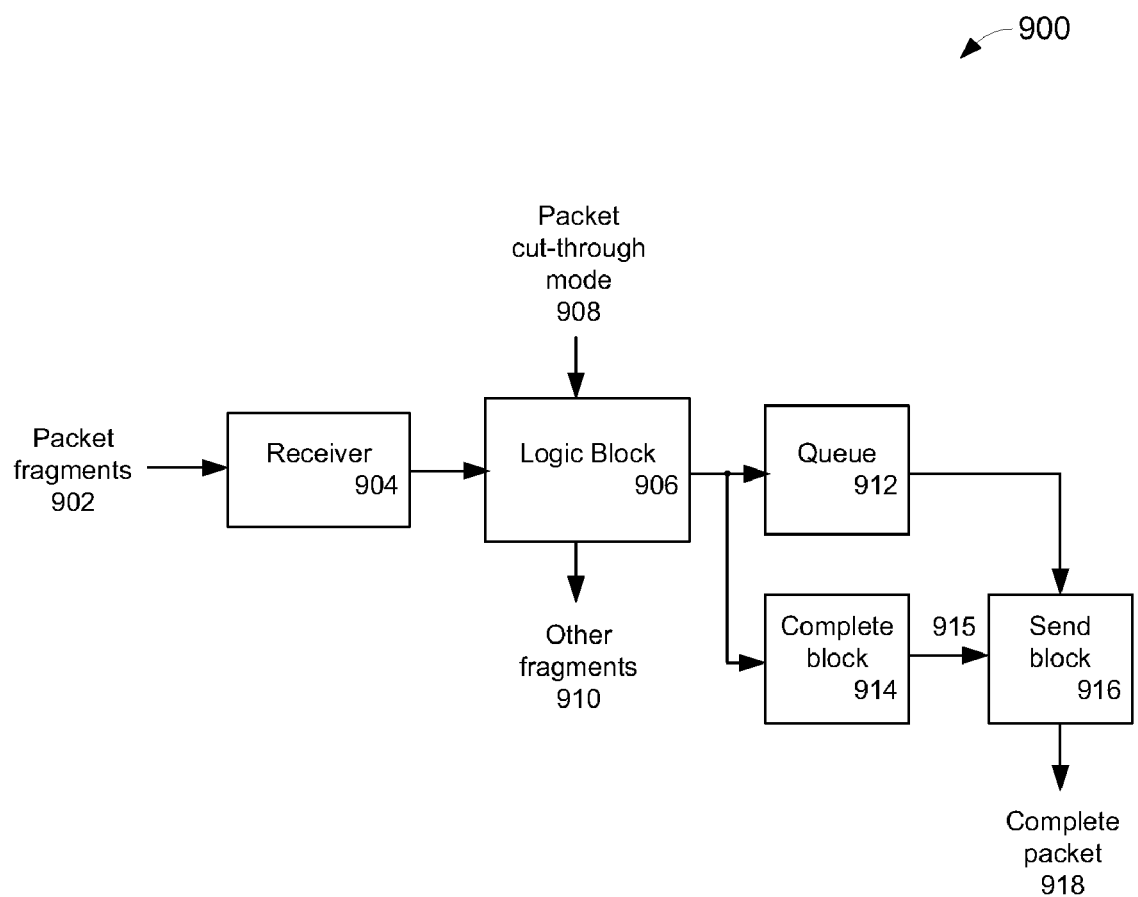
FIG. 9 illustrates one embodiment of the present invention in block form.

FIG. 9 illustrates, generally at 900, one embodiment of the present invention in block form. At 904 a receiver inputs packet fragment 902. At 906 a logic block inputs the fragments from the receiver 904 and determines if the packet fragments are part of a packet that has requested packet cut-through mode 908. If not then, then these other fragments 910 are directed for other processing. If the fragments are part of a packet cut-through request then they are sent to the queue 912 and a complete block 914. The complete block 914 sends a signal 915 to the send block 916 when all packet fragments associated with a packet are in the queue 912 at which time it sends the queue contents as a complete packet 918.

Thus a method and apparatus for packet cut-through have been described.

Figure 1:
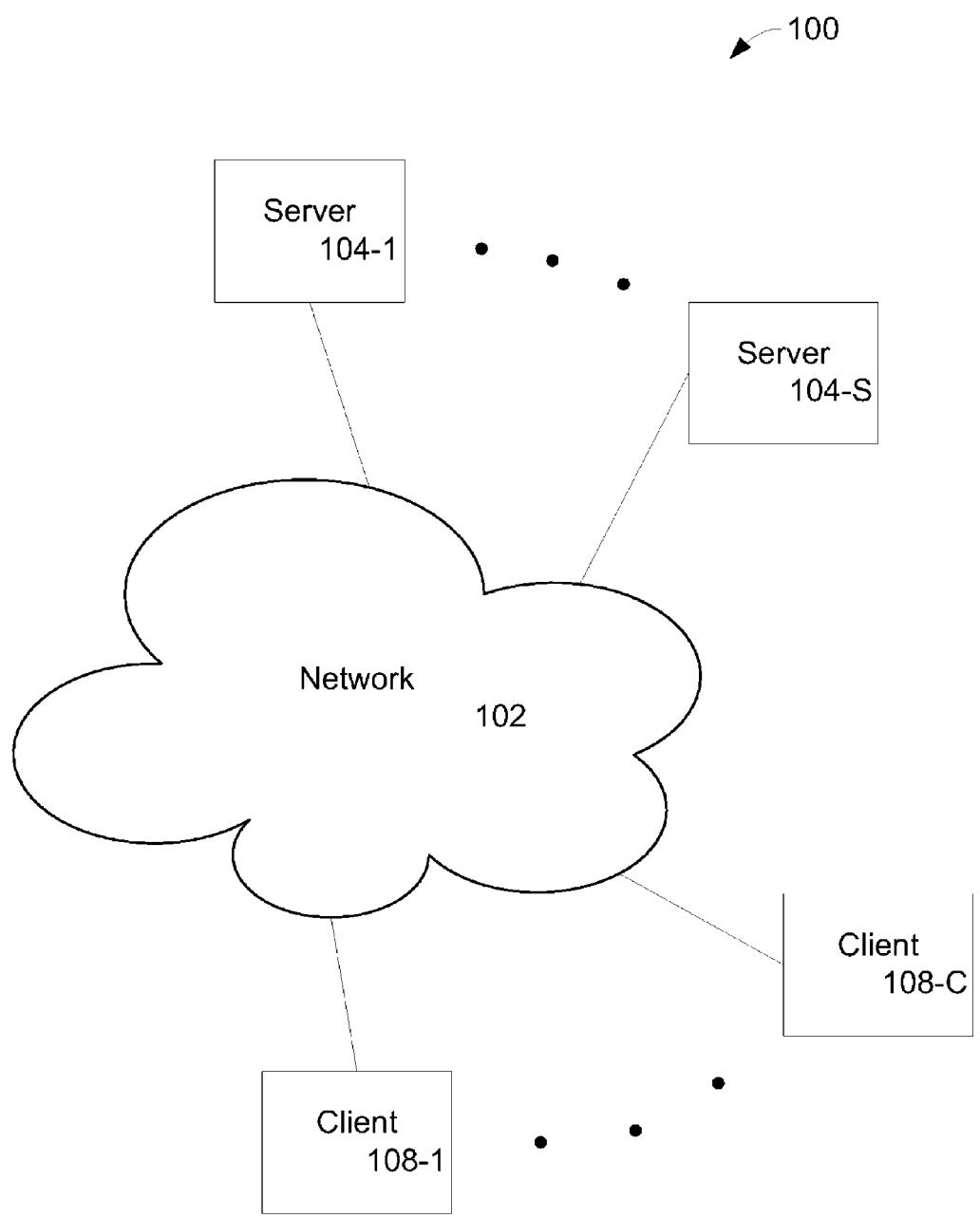
FIG. 1 illustrates a network environment in which embodiment(s) of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
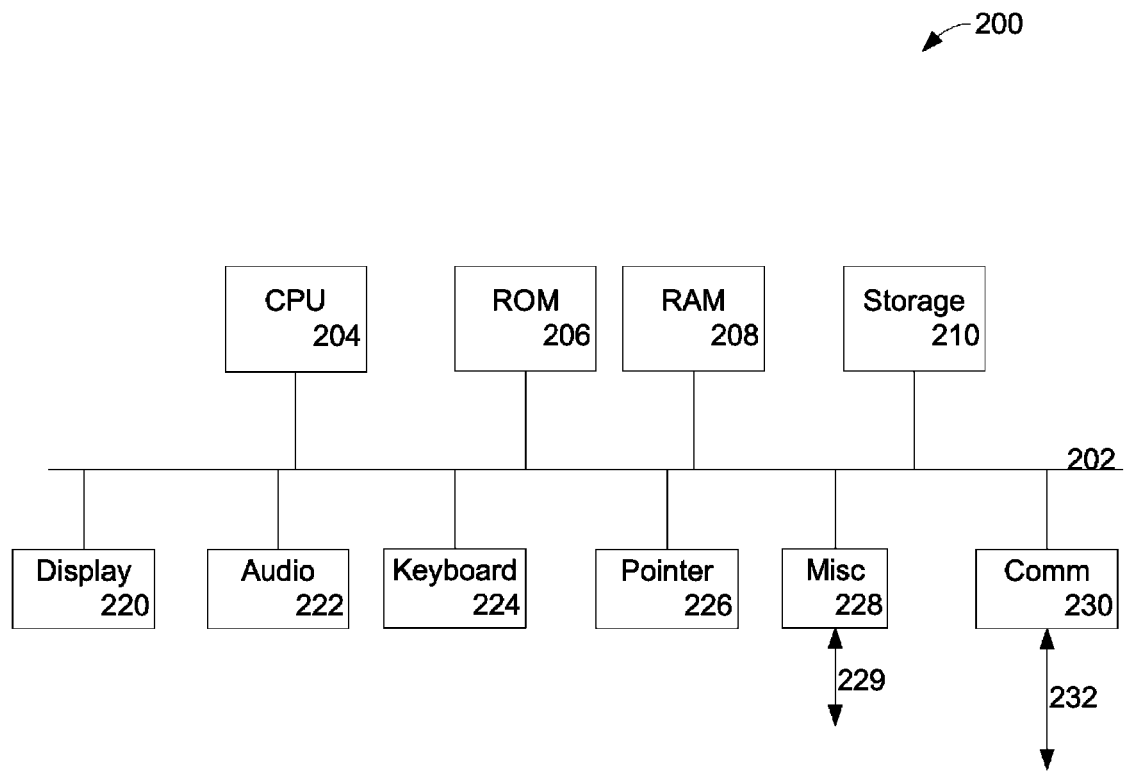
FIG. 2 is a block diagram of a computer system in which embodiment(s) of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of communicating means or device whether local or remote, such as a LAN, a WAN, a system bus, CPU, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210 may be Compact Disc (CD), Digital Versatile Disk (DVD), hard disks (HD), optical disks, tape, flash, memory sticks, video recorders, etc. CPU 204 might use, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which when received cause physical movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Reference has been made to "SPI", "SPI-4", and similar terms. One of skill in the art will understand that this refers to the System Packet Interface and the specification as published by the Optical Internetworking Forum (OIF). Such specifications may be obtained from the OIF at http://www.oiforum.com/. One of skill in the art is considered familiar with the SPI specification.

Thus a method and apparatus for packet cut-through have been described.

What is claimed is:

1. An apparatus comprising:
    a receiver having an input and an output, said input capable of being operatively coupled to receive packet fragments;
    a logic block having a first input, a second input, a first output, and a second output, said first input coupled to receive said receiver output, said second input coupled to receive a packet cut-through mode signal, said first output capable of sending fragments;
    a queue having an input and an output, said input coupled to said logic block second output;
    a complete block having an input and an output said input coupled to said logic block second output; and
    a send block having a first input, a second input, and an output, said first input coupled to said queue output, said second input coupled to said complete block output, and said output capable of sending fragments.

2. The apparatus of claim 1 further comprising:
    means for determining if said packet cut-through mode signal is active; and
    if so then;
        means for assembling all packet fragments associated with a packet in said queue; and
        means for sending said all packet fragments to one logical data flow via said send block.

3. The apparatus of claim 2 wherein said means for assembling further comprises:
    means for examining packet fragments;
    means for determining if any of said packet fragments are associated with said packet; and
    if so then;
        means for queuing up said determined said packet fragments.

4. A non-transitory computer readable storage medium having stored thereon instructions and information, which when executed extracts a representation of the apparatus of claim 2.

* * * * *